(12) United States Patent
Dutta et al.

(10) Patent No.: US 8,412,744 B2
(45) Date of Patent: Apr. 2, 2013

(54) VISUALIZATION OF RUNTIME ANALYSIS ACROSS DYNAMIC BOUNDARIES

(75) Inventors: Suhail Dutta, Seattle, WA (US); Brian Robert Crawford, Seattle, WA (US); Elliott Ross Conant, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 12/821,892

(22) Filed: Jun. 23, 2010

(65) Prior Publication Data

US 2011/0321001 A1 Dec. 29, 2011

(51) Int. Cl.
*G06F 17/30* (2006.01)
(52) U.S. Cl. .......................... 707/802
(58) Field of Classification Search .............. None
See application file for complete search history.

(56) References Cited

U.S. PATENT DOCUMENTS

| | | | |
|---|---|---|---|
| 7,174,536 B1 | 2/2007 | Kothari et al. | |
| 7,219,341 B2 | 5/2007 | Dalton et al. | |
| 7,530,054 B2 | 5/2009 | Reimer et al. | |
| 2008/0127051 A1 | 5/2008 | Milligan | |
| 2010/0042981 A1* | 2/2010 | Dreyer et al. | 717/146 |
| 2012/0144376 A1* | 6/2012 | Van Eijndhoven et al. | 717/146 |

OTHER PUBLICATIONS

Dragon: An Open64-Based Interactive Program Analysis Tool for Large Applications—Published Date: Aug. 27, 2003 http://ieeexplore.ieee.org/stamp/stamp.jsp?tp=&arnumber=1236416 (5 pages).
Interactive Visualization of Object-Oriented Programs—Published Date: Jun. 15, 2005 http://www.cse.buffalo.edu/pub/WWW/LRG/Research/jive-dissertation.pdf (259 pages).
Java Performance Tuning—Published Date: Oct. 2007 http://www.javaperformancetuning.com/tools/eoSense/ (9 pages).
A Field Study in Static Extraction of Runtime Architectures—Published Date: 2008 http://www.cs.cmu.edu/~mabianto/papers/08-paste.pdf (7 pages).
Impact Analysis with Rational Architecture Management Tools—Published Date: Apr. 15, 2007 http://www.ibm.com/developerworks/rational/library/apr07/sundman/index.html#N10086 (13 pages).
UML 2 Deployment Diagrams—Retrieved Date: Apr. 9, 2010 http://www.agilemodeling.com/artifacts/deploymentDiagram.htm (5 pages).

\* cited by examiner

*Primary Examiner* — Bai D. Vu
(74) *Attorney, Agent, or Firm* — Workman Nydegger

(57) ABSTRACT

The formulation of an architectural diagram of a software program having multiple components. A static model identifying at least some of the components and a relationship between the components is accessed by perhaps performing a static code analysis of the code of the software program. A dynamic analysis is also performed by executing the software program, and observing the execution to derive dynamic behaviors of the software program. These dynamic behaviors may perhaps be information that is not readily available based on a static code analysis of the computer program alone, such as parameter values exchanged, paths of execution, and additional components invoked. The architectural diagram is then formulated using the static model and the dynamic behaviors to generate a more complete representation of the computer program.

19 Claims, 9 Drawing Sheets

VISUALIZATION OF RUNTIME ANALYSIS ACROSS DYNAMIC BOUNDARIES

BACKGROUND

The functionality offered by software is becoming ever more complex. Architectural diagrams are used to provide an overview of the functionality and/or structure of software. There are a variety of types of architectural diagrams used for software. Common amongst all these architectural diagrams is some visual representation of multiple components of the software, along with some visualization of relationships between the components. The Unified Modeling Language (UML) is a standardized modeling language and includes a set of graphical notation techniques to create visualizations of software-intensive systems. The UML defines a number of different types of architectural diagrams.

Architectural diagrams have historically first been constructed manually, in which an author draws the diagram to highlight a design or requirement of the software. More recently, automated generation of architectural diagrams is employed. Such automated systems perform a static code analysis of the source code, intermediate code, and/or binary code. From this static code analysis, the system may derive information from which a static model of the code may be derived, the static model representing various components of the software and their relationships. From that static model, an architectural diagram may be automatically constructed.

BRIEF SUMMARY

At least one embodiment described herein relates to the formulation of an architectural diagram of a software program having multiple components. A static model identifying at least some of the components and a relationship between the components is accessed. For instance, a static code analysis of the code of the software program may reveal an identification of the components and information regarding relationships between the components. A dynamic analysis is also performed by executing the software program, and observing the execution to derive dynamic behaviors of the software program. These dynamic behaviors may perhaps not be readily understood from the static model. The architectural diagram is then formulated using the static model and the dynamic behaviors to generate a more complete representation of the computer program. The architectural diagram may perhaps be displayed on a display for human interpretation.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the formulation of an architectural diagram of a software program having multiple components is described. A static model identifying at least some of the components and a relationship between the components is accessed by perhaps performing a static code analysis of the code of the software program. A dynamic analysis is also performed by executing the software program, and observing the execution to derive additional dynamic behaviors of the software program. These dynamic behaviors may perhaps not be readily understood from the static model alone, such as parameter values exchanged, paths of execution, and additional components invoked. The architectural diagram is then formulated using the static model and the dynamic behaviors to generate a more complete representation of the computer program.

First, some introductory discussion regarding computing systems will be described with respect to FIG. 1. Then, the embodiments of the formulation of software program architectural diagrams will be described with respect to FIGS. 2 through 9.

Figure 1:
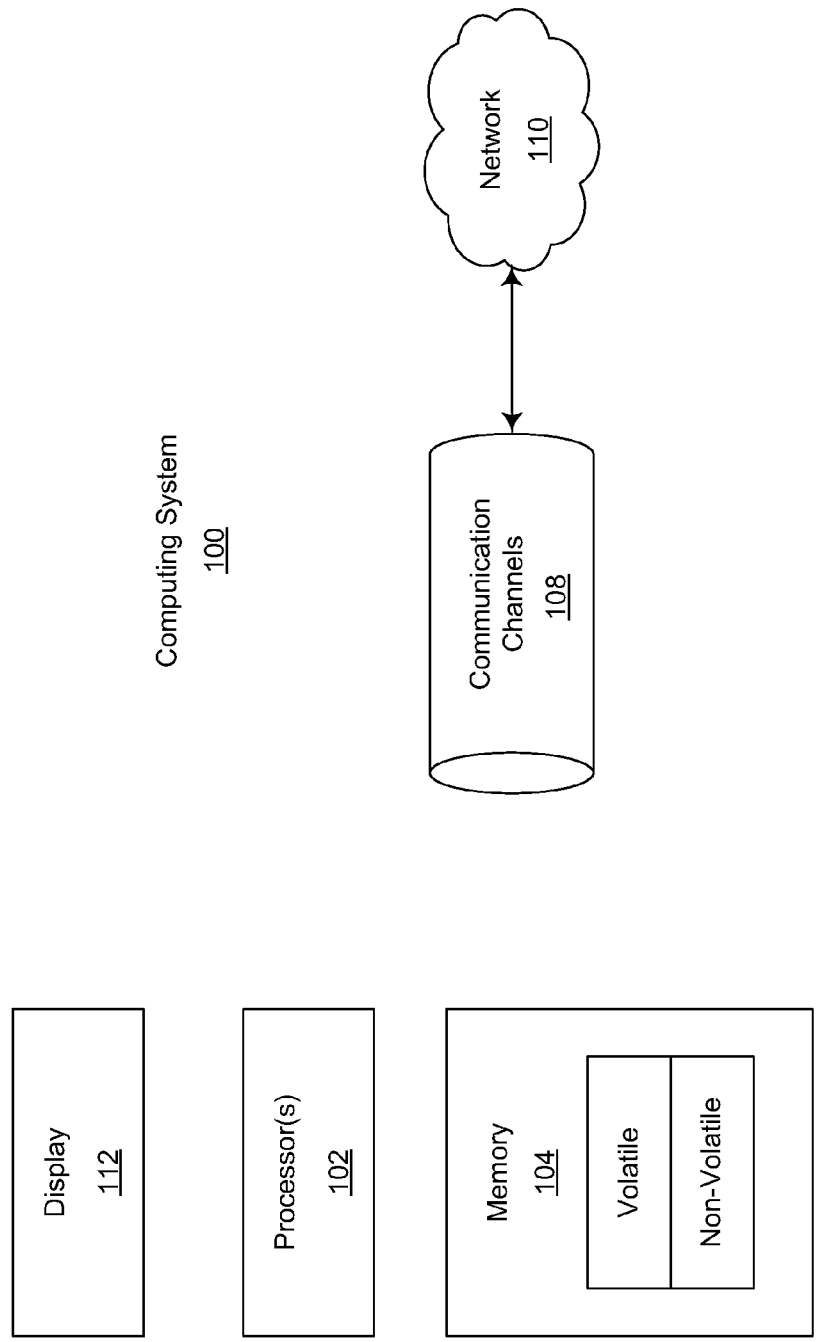
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
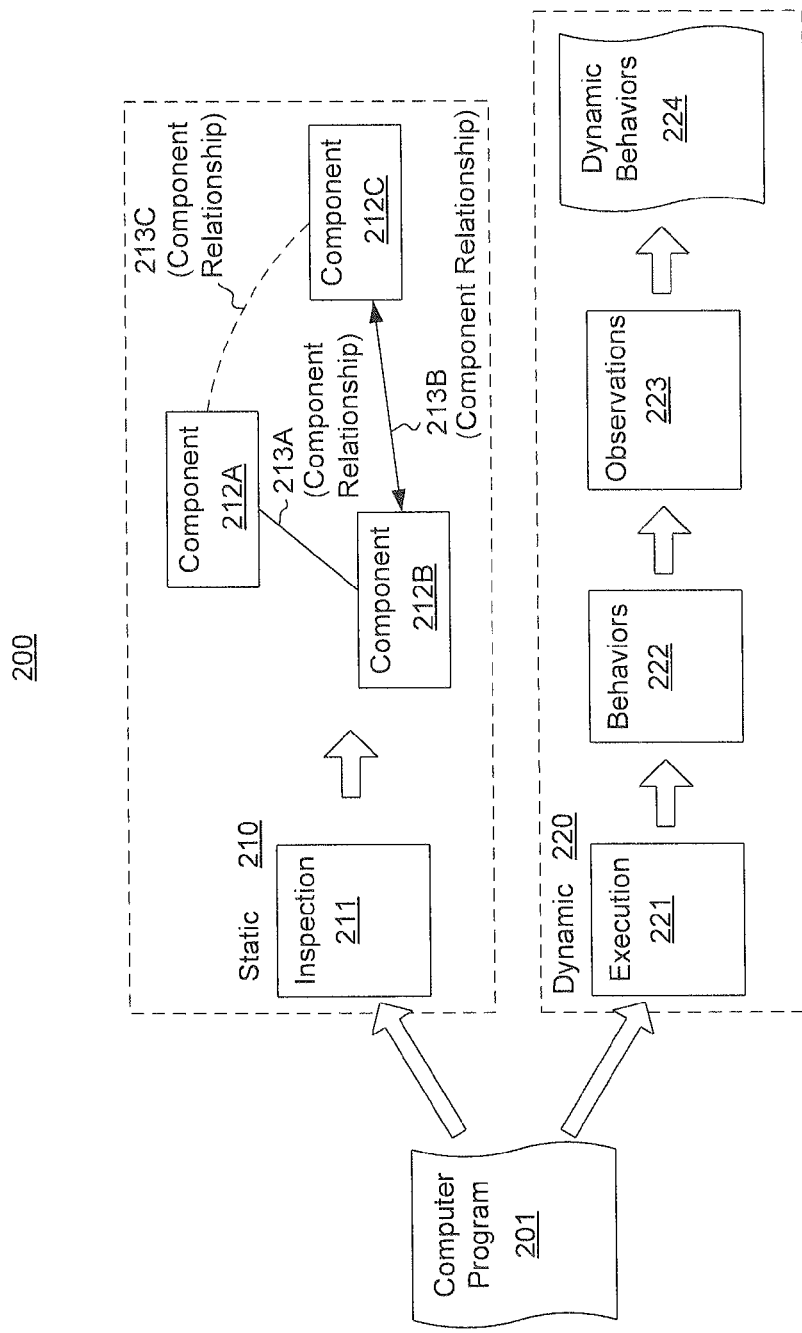
FIG. 2 illustrates an environment in which analysis of a computer program may be performed.

FIG. 2 illustrates an environment 200 in which an analysis of a computer program 201 may be performed. The computer program 201 may be automatically analyzed using static code analysis 210 or dynamic analysis 220.

In static code analysis 210, an inspection module 211 inspects the source code, intermediate code and/or binary code of the computer program. From this static code analysis, a static model of the code may be determined. As an example, a number of the components of the software program 201 may be identified along with a number of relationships between such components. For instance, in FIG. 2, the inspection module 211 identifies components 212A, 212B and 212C with corresponding relationships 213A, 213B and 213C. Static code analysis may be used to formulate a static model of computer programs regardless of the number of components in the computer program. Static code analysis is known in the art.

In dynamic analysis 220, the computer program 201 is actually executed using execution module 221 (e.g., computer processor(s)). In this description and in the claims, code being "executed" in the context of dynamic analysis could also include the code being simulated in which case the code is run on a simulator, rather than the actual machine. From this, dynamic behaviors 222 of the computer program may be observed by observation module 223 to thereby generate additional dynamic behaviors 224 regarding the computer program 201.

The static code analysis 210 and the dynamic analysis 220 may be performed by a computing system at the direction of computer-executable instructions that are present on one or more computer-readable media. Such computer-readable media may form a computer program product.

Figure 3:
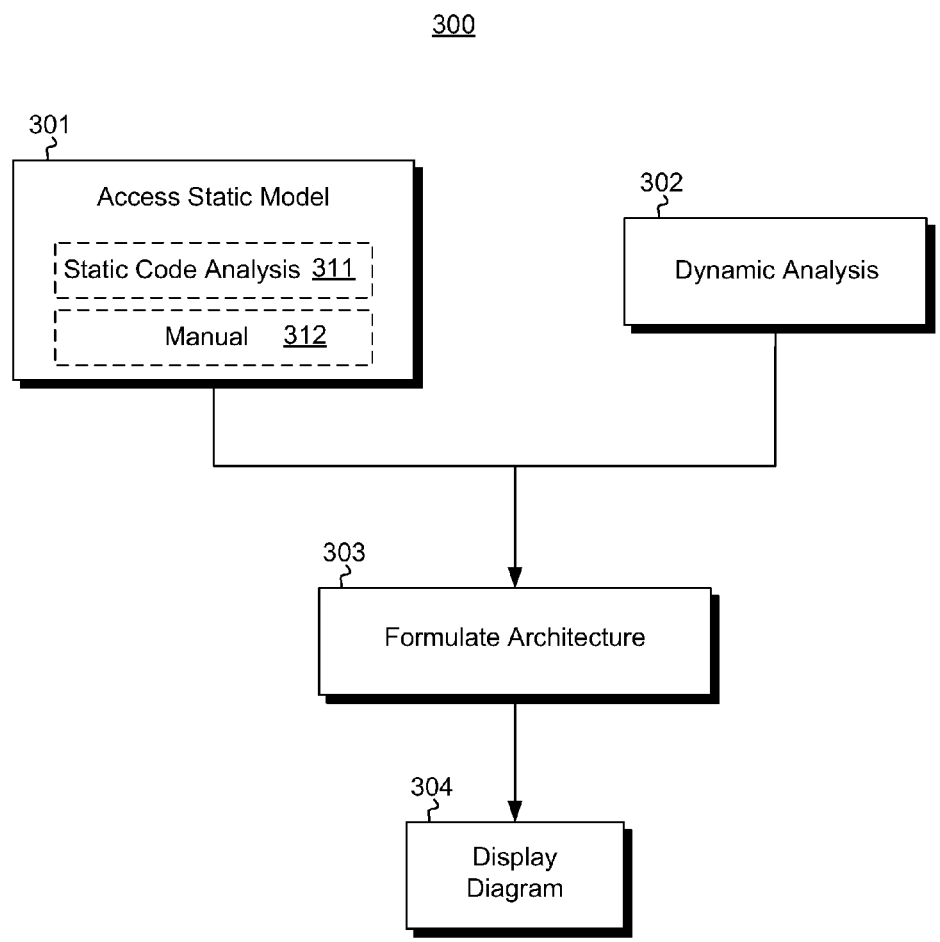
FIG. 3 illustrates a flowchart of a method for formulating an architectural diagram.

FIG. 3 illustrates a flowchart of a method 300 for formulating an architectural diagram. The method 300 may be performed using the environment 200 of FIG. 2. Accordingly, FIG. 3 will now be described with frequent reference to FIG. 2.

The method 300 includes accessing of an identification of a set of components of a computer program and a relationship between the set of components (act 301). By doing so, the method 300 accesses a static model of the software program. This static model may have been acquired from the results of a status analysis (act 311) (such as static code analysis 210) of the software program. Alternatively or in addition, the identification may be a manually created identification (act 312). For instance, a programmer might analyze the code and/or the documentation associated with a computer program to thereby identify at least some of the components in and relationships between components of a software program.

In addition, a dynamic analysis of the software program is performed (act 302). The dynamic analysis (act 302) is shown in parallel with the act of acquiring an identification of the components (act 301) to emphasize that the embodiments of the method are not limited to embodiments in which one occurs after the other. The dynamic analysis identifies dynamic behaviors of the software program. The dynamic behaviors may not be information that was obtainable, or may be information that would be difficult to be obtained, from static code analysis alone.

The architecture diagram is then formulated (act 303) that merges the static model with the dynamic behaviors (act 303). The architectural diagram may then be displayed (act 304). As previously mentioned, there is no limit to the type of architectural diagram generated in accordance with the principles described herein. Examples include a sequence diagram and a dependency graph.

Figure 4:
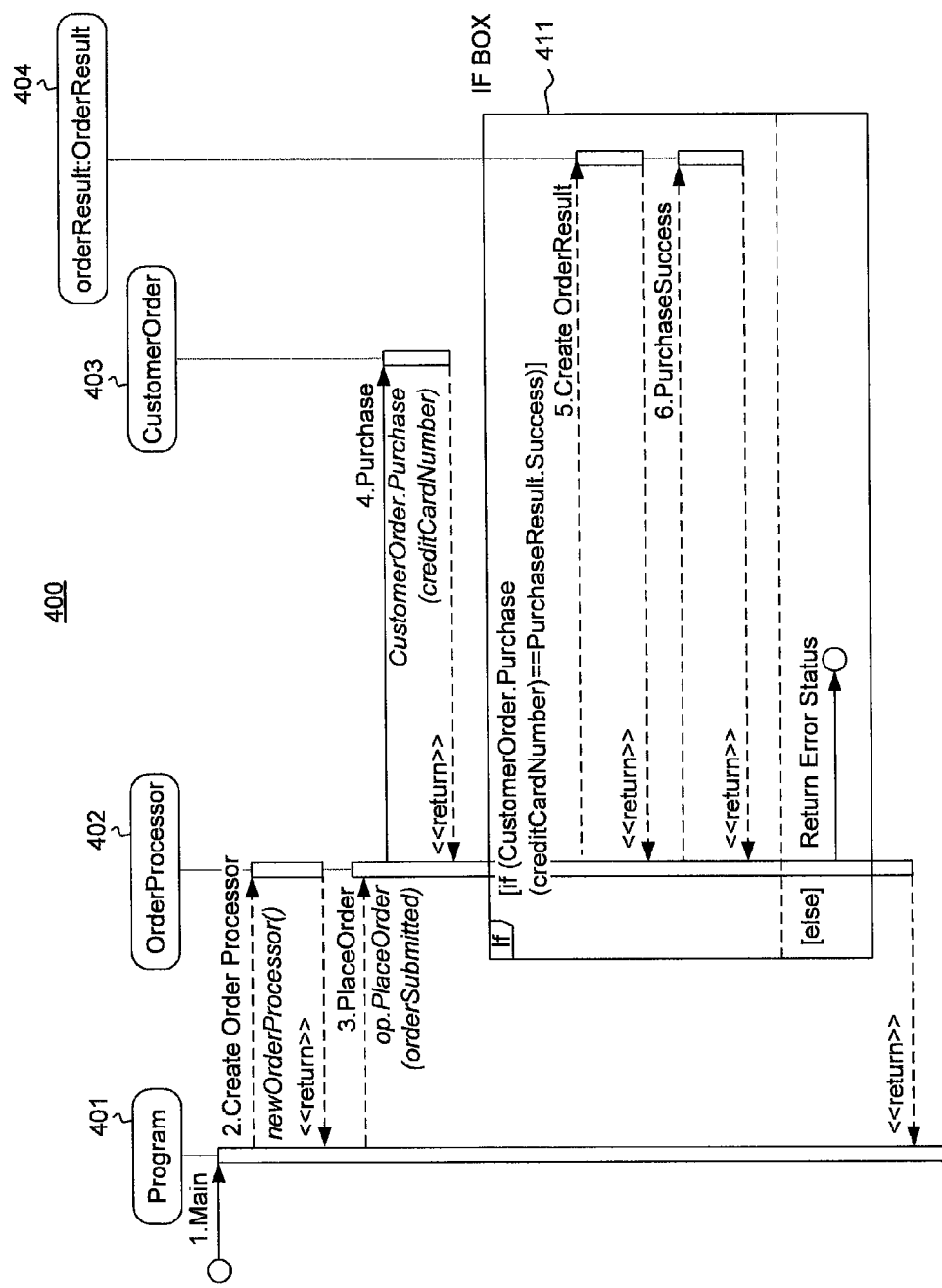
FIG. 4 illustrates a sequence diagram constructed from information derived from a static code analysis alone.
Figure 5:
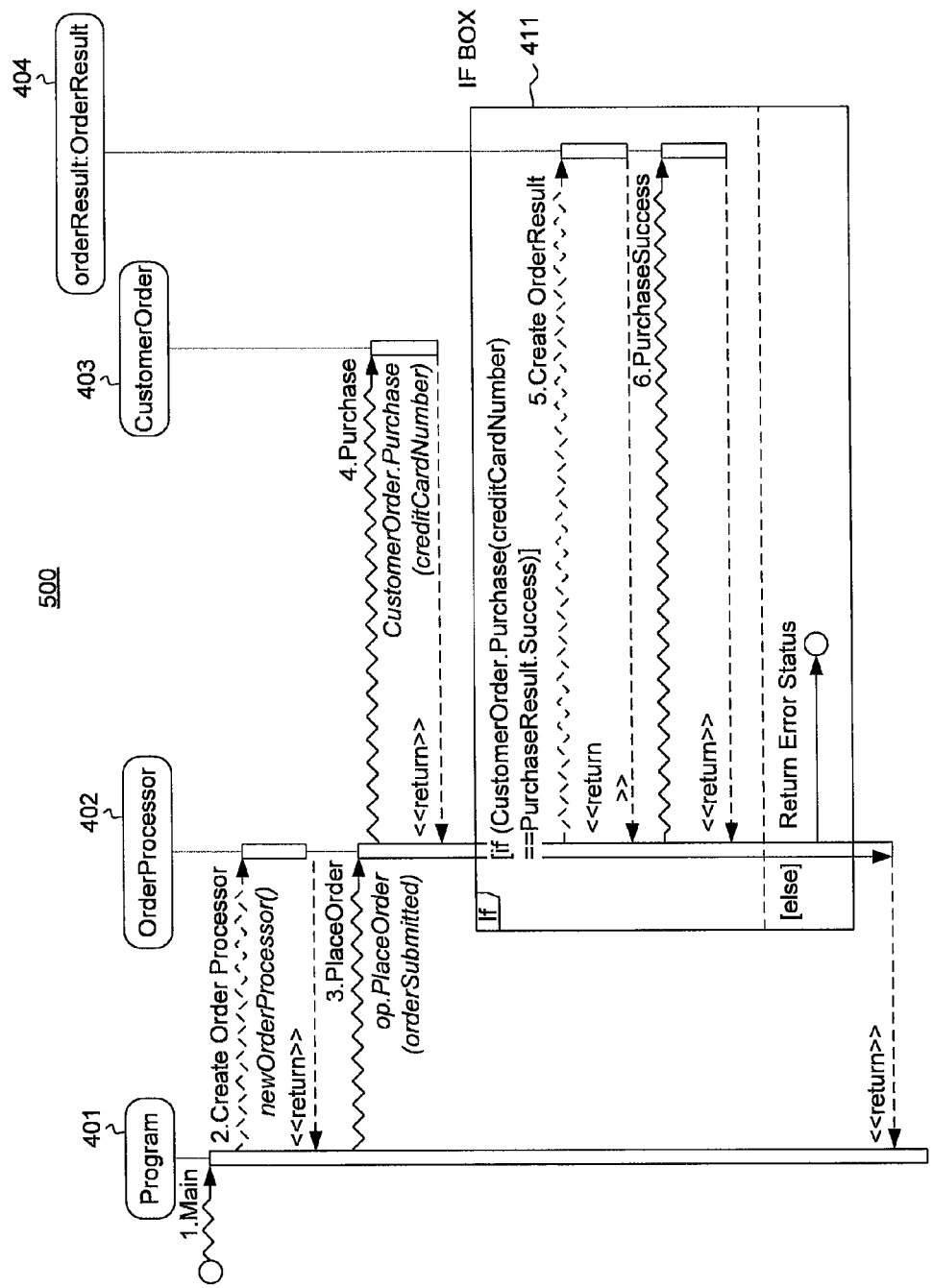
FIG. 5 modifies FIG. 4 to include representations of additional dynamic behaviors derived from a dynamic analysis in the form of an identification of an execution path traversed during the actual execution of the computer program.
Figure 6:
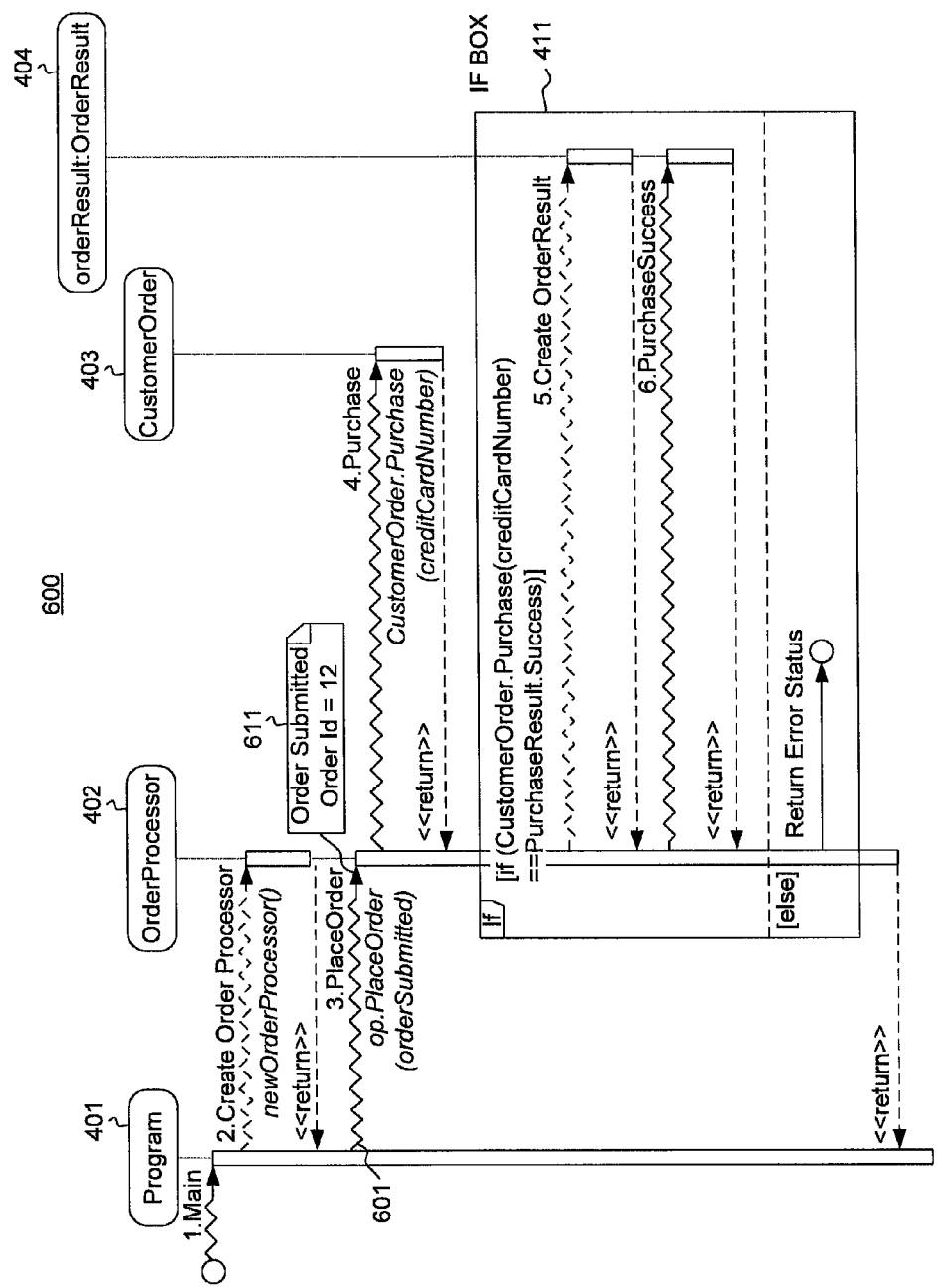
FIG. 6 modifies FIG. 5 to additionally represent dynamic behaviors regarding the actual values of parameters exchanged between components during the execution of the computer program.
Figure 7:
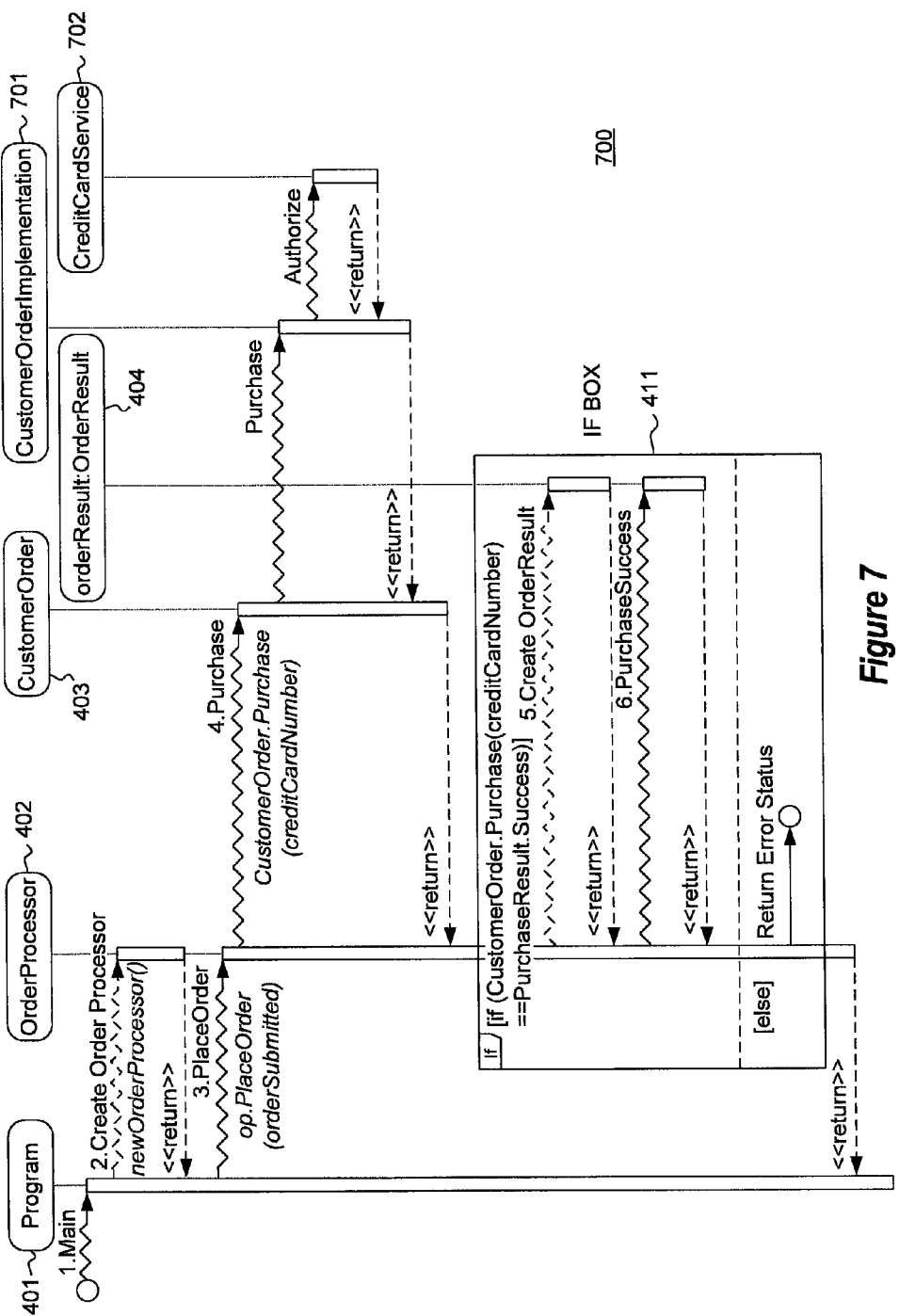
FIG. 7 modifies FIG. 5 to further represent dynamic behaviors in the form of additional components that were invoked during the execution of the computer program, but which were not defined by the computer program itself.

Examples of dynamic behaviors will be provided below with respect to FIGS. 4 through 7, in which the architectural diagrams are sequence diagrams. FIG. 4 illustrates a sequence diagram constructed from information derived from a static code analysis alone. Thus, FIG. 4 merely represents a static model of the code. FIGS. 5 through 7 illustrate sequence diagrams that add onto the static model with dynamic behaviors obtained through a dynamic analysis of the code. For instance, FIG. 5 modifies FIG. 4 to include dynamic behaviors in the form of an identification of an execution path (shown as a zigzagged line) traversed during the actual execution of the computer program. FIG. 6 modifies FIG. 5 to additionally include dynamic behaviors (shown for example at 611) regarding the actual values of parameters exchanged between components during the execution of the computer program. FIG. 7 modifies FIG. 5 to further identify dynamic behaviors in the form of additional components (as shown at 701 and 702) that were invoked during the execution of the computer program, but which were not defined by the computer program itself. Each of these FIGS. 4 through 7 are just examples of the architectural diagrams that may be generated using the principles described herein. Any type of architectural diagram may be constructed using the principles described herein.

FIG. 4 illustrates a sequence diagram 400 that represents an example sequence diagram that may be generated based on static code analysis alone. The static code analysis has identified four program components 401, 402, 403 and 404. The static code analysis has also identified relationships between the components. In a sequence diagram, those relationships are functional calls and returns (which are numbered with reference numerals 1.-6. in the diagram).

In FIG. 4, the static code analysis has revealed that the program 401 places a call "CreateOrderProcessor", which results in the creation of OrderProcessor 402. The OrderProcessor 402 performs its processing and then returns.

The program 401 then places a call "PlaceOrder" to the OrderProcessor 402. The OrderProcessor 402 then places a "Purchase" call into the CustomerOrder 403, which then returns.

Some conditional logic may be performed as represented by If box 411. The condition for execution of the flow within the If box 411 is if the purchase call returned in success. If it did, then the OrderProcessor 402 places a Create OrderResult call thereby resulting in the creation of the orderResult 404, which returns. Then, a PurchaseSuccess call is placed by the OrderProcessor 402 into the order result 404, which then returns. If the condition had not be met, an error status is returned as apparent from the else portion of the If box 411.

Upon completion of processing, the OrderProcessor 402 returns control back to the program 401. Once again, the sequence diagram 400 may be generated from static code analysis alone.

FIG. 5 illustrates a sequence diagram 500 in which the static model of FIG. 4 is supplemented with dynamic behaviors obtained from a dynamic analysis of the computer program. In this case, the dynamic information is the actual execution path taken when executing the computer program. In the illustrated case of FIG. 5, the path is a branch, but execution paths also could also be a loop. The execution path is represented in FIG. 5 using zig-zagged arrows. However, colors or other visualizations may also be used to distinguish actual execution paths from other possible execution paths.

Referring to FIG. 5, the actual execution begins with the instantiation of the program 401. Then the CreateOrderProcessor was called to create OrderProcessor 402. Upon returning, the OrderProcessor 402 called the CustomerOrder 403 with a Purchase method. Upon returning, the dynamic execution path information clarifies that the condition specified in the If box 411 must have been satisfied since the actual execution resulted in the OrderProcessor 402 calling the OrderResult 404 with the CreateOrderResult method, followed by the OrderProcessor 402 calling the PurchaseSuccess method. The call specified in the "else" portion of the If box 411 was not executed during the execution observed by the dynamic analysis. Thus, the actual execution path may be observed and merged with the static structure of the computer program.

FIG. 6 illustrates a sequence diagram 600 in which FIG. 5 is further supplemented with yet additional dynamic behaviors obtained from a dynamic analysis of the computer program. In this case, the dynamic behavior is the actual values for parameters exchanged during a call. Specifically, function call 601 is supplemented with a visualization 611 that shows the value of parameter "orderId" is 12.

FIG. 7 illustrates a sequence diagram 700 in which FIG. 5 is further supplemented with additional dynamic behaviors obtained from a dynamic analysis of the computer program. In this case, the dynamic behavior is the identity of the actual external modules that are called during execution of the computer program, and the interaction identified with those external modules. These external modules 701 and 702 may be modules that it is difficult or not possible to identify by a static code analysis. For instance, the computer program and specifically the CustomerOrder module 403 might charge a credit card using the CustomerOrderImplementation module 701, which likewise using the CreditCardService module 702 to authorize the credit card.

This description will now describe how the static model may be merged with dynamic behaviors. There are two broad divisions that will be described herein regarding how correlation of a static model with dynamic behaviors may be accomplished using the principles described herein. The first division approaches the problem from the point of view of mapping program execution flow between the static model and dynamic behaviors. The second division approaches the problem from the point of view of mapping the object instances (lifelines in a sequence diagram) between the static model and the dynamic behavior.

The first division of mapping program execution flow between static model and dynamic behaviors will now be described. Matching dynamic behaviors against a static model can be quite challenging—from both a qualitative (correctness) and quantitative (performance) aspect. Depending on the quality of the data, different algorithms can be used. The algorithms mentioned herein use the concept of following the path of execution through the static model from the events in the dynamic behaviors and linking the dynamic events to locations in the static model.

If the dynamic events and static model are detailed enough such that it is possible to exactly match the dynamic events to locations in the static model, then a very direct algorithm which simply follows the path of execution through the static model and matches dynamic events to static model locations is sufficient.

If the static model or dynamic events is less detailed, then matching the dynamic events to static model locations may become ambiguous. The ambiguity can take multiple forms, such as not being able to tell which overloaded method was called, how many times a loop iterated, or which branch of a conditional was taken. To solve the ambiguity, various algorithms and heuristics can be used.

One such algorithm naively searches within a limited scope of the static model and applies heuristics to decide how execution proceeds through the static model. Once a decision has been made, another search within a limited scope happens, and so on until a complete path of execution through the static model is found. This algorithm may employ more advanced techniques for resolving ambiguity such as looking ahead to make sure the next N events can be matched to the static model instead of just the very next event.

Another more sophisticated algorithm frames the problem as being similar to regular expression matching. The static model defines a pattern from which the dynamic behaviors were produced, and the problem is to find a derivation of how the dynamic behavior originated from the static model. Again, heuristics may be used to resolve some kinds of ambiguity.

Six examples of heuristics that could be used in the matching algorithms will now be described. Each may be used in conjunction with each other:

1. Scope

Figure 8:
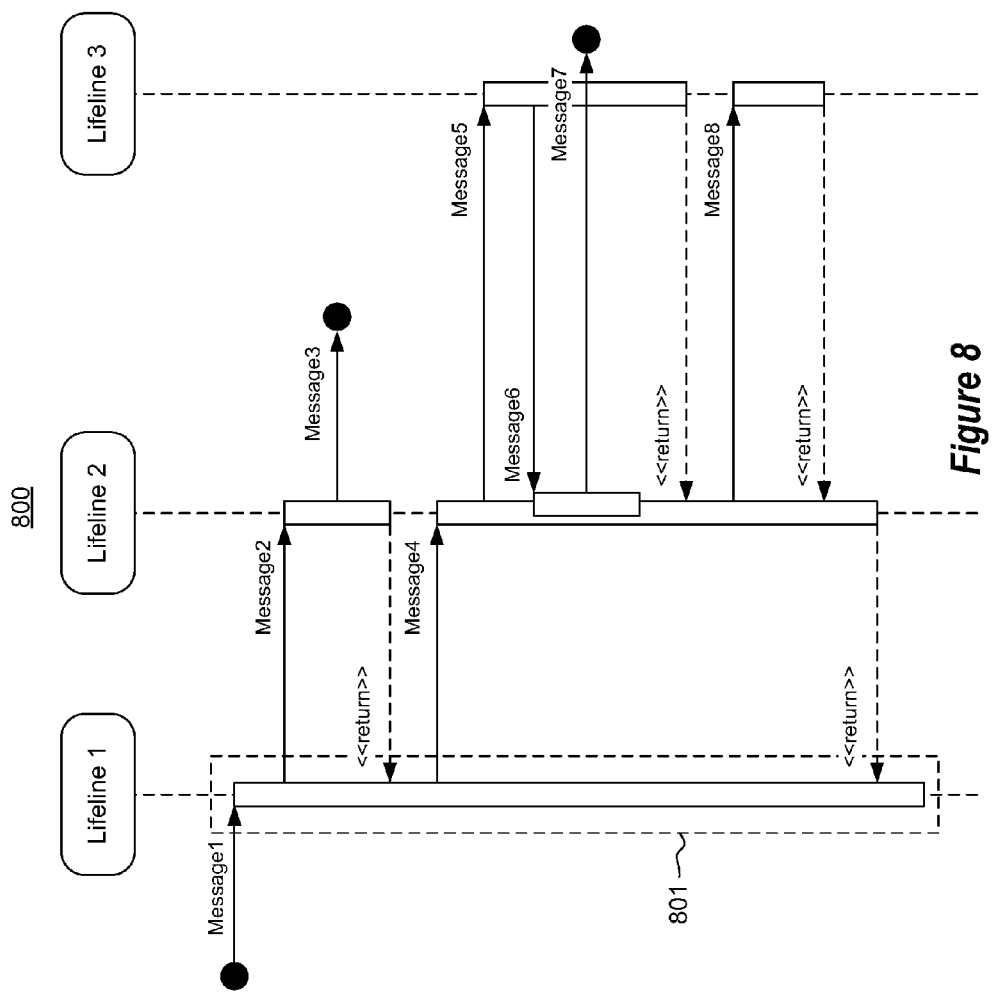
FIG. 8 is a sequence diagram used to describe the scoping heuristics method.

The scope heuristics example will be described with respect to the example sequence diagram 800 of FIG. 8. Once Message1 is matched on the diagram, we know that the next message must occur in the dotted boxed section 801 of FIG. 8. This drastically reduces the set of messages that need to be matched. The heuristics does not need to know whether there is another Message2 on the diagram because the only Message2 that could have occurred is the one shown.

2. Name of Message/Method

In this example, the name of the method that occurred is matched against the name of the message/method on the diagram. This simple string match eliminates most of the options and in some cases may return an exact match. However, if it does not, the subsequent heuristic examples may be used.

3. Number of Parameters

The filtered list of possible matches from the name of message/method heuristic example is further filtered using the number of parameters for a method. For instance, consider the runtime trace "method=Foo(Param1, Param2)" {the types are not important in this example}. Now suppose the list of possible matches for the Name of message/method included four possible matches as follows: Foo(int), Foo(int, string), Foo(string, string), and Foo(int,string,string)". Comparing the possible list of matches against the runtime trace, the list of possible matches can be further filtered down to just two possible matches Foo(int,string), Foo(string,string). This is an important intermediate step because it can further reduce the dataset in examples where there are a lot of overloads.

4. Types

The invocation target type of the method can be used to filter down the set of matches. Furthermore, the types of the parameters can be used to disambiguate further ties. The return type can be used to yet further disambiguate.

5. Look Ahead

Figure 9:
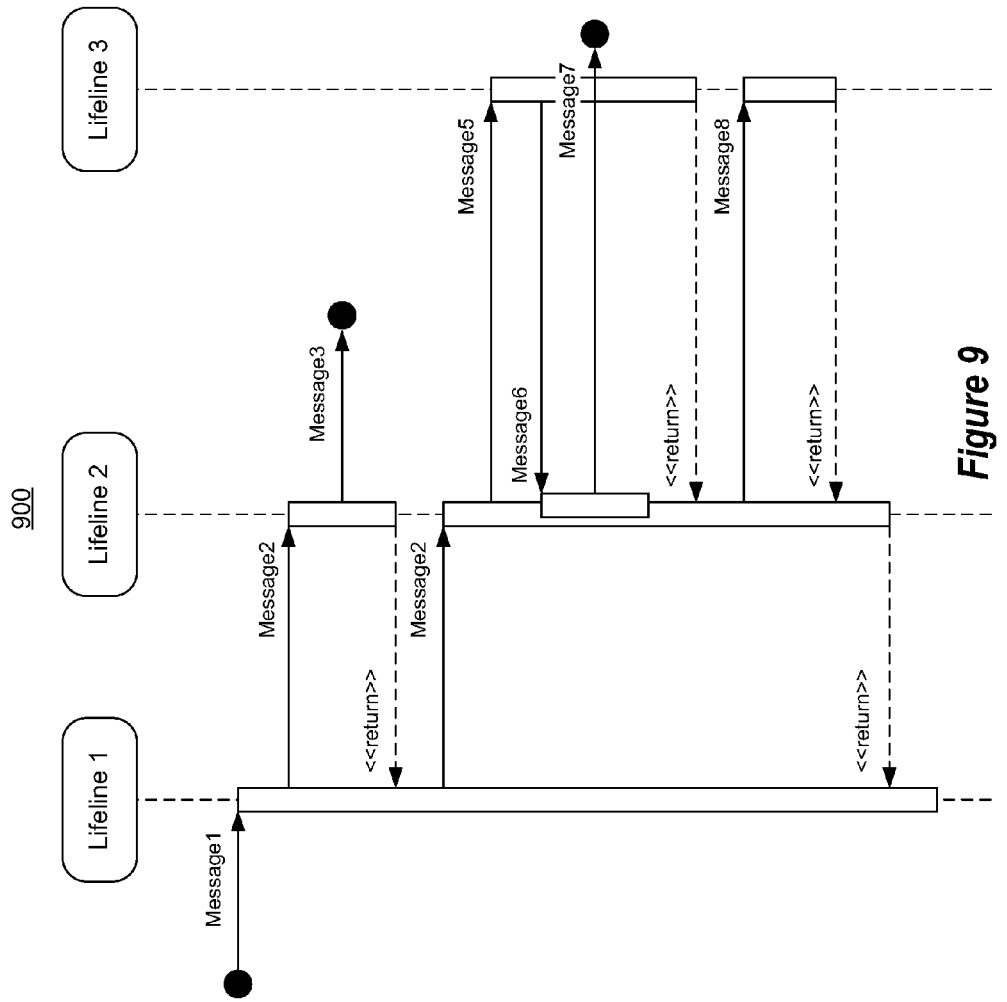
FIG. 9 is a sequence diagram used to describe the look ahead heuristics method.

The look ahead heuristics example will be described with respect to the sequence diagram 900 of FIG. 9. Referring to FIG. 9, the method may filter down the possible options by matching events that occur after the event that is being matched. Since there are two Message2 occurrences, the next message is evaluated to see if we can find a match. If the evaluation sees that Message3 occurs next (as is the case in FIG. 9), then the analysis can infer which path to take. This method may further be optimized by reducing the number of look aheads based on the size of the data. This method can also be used for disambiguation of loops and conditionals.

6. Determining how Many Dynamic Events to Put in a Loop

The maximal munch rule could be used for loops, which says to put as many dynamic events as possible into a loop. The maximal munch rules comes from parsing theory and works as follows.

Assume that the following code is being evaluated:

```
For (int I = 0; I < 5; i++)
{
    A( );
}
A( );
...
```

Assume further that the code encounters a stream of calls from the dynamic data: A,A,A,A,A,A, . . . .

In this case, the analysis assigns as many A's as possible to the loop, and perhaps uses the lookahead heuristics to figure out that one A (the sixth A) is to be saved for the call below the loop.

Recall that the second division of mapping a static model to dynamic behaviors was mapping object instances between the static model and dynamic behaviors. One of the techniques that can be used to connect object instances between the static model and dynamic behaviors is referred to herein as "object identifier correlation". When the static model is built, instances of objects are tracked, regardless of the alias (variable name) used to refer to the object. During the dynamic analysis, instances of objects are also tracked. When the object identifier systems in the two models are correlated, object instances and operations on those instances can be aligned between the static model and the dynamic behavior. One approach to doing this follows:

1. When building the static model, determine object instances and assign each instance a unique identifier that is used regardless of the alias used to refer to the instance.
2. When identifying dynamic behaviors from the execution of the program, collect information that allows for uniquely identifying object instances. For example, for systems with non-moveable heap objects (C++, for example), tracking the address of the object instance is usually enough. For systems with garbage collected heaps (CLR, for example), object instances are tracked across garbage collections where they may be relocated as heap space is compacted.
3. Use the object identifiers collected in step 2 to maintain object instances when performing the dynamic analysis.
4. When the models are combined, correlate the two object identifier systems by synchronizing object identifiers at known points in the program's execution. Depending on the level of data collected, these can be at each instruction, each object allocation, each block within a function, each function call, each function entry point, and/or each function return point. Using the code example below, if an object instance with id=1 is created in the static model on line 4 and an object in the dynamic model is created with id=101, then these two identifiers can be linked, and later, when either identifier is seen, the object instances between the static model and dynamic behaviors can be mapped. This technique allows for sparse recording/modeling in either the static model or the dynamic behaviors. For example, if the dynamic analysis only recorded data each time an object was created and a function was called, the correlation between the static model and dynamic behaviors would synchronize there (i.e. static id 1 would be mapped to dynamic id 101 on line 4) and, later, if a dynamic function call were made (not available in the static model because it's dynamic), passing an object with dynamic id 101, the object instance with static id 1 would be correctly associated, even though that information was not originally available in the static model (line 12).

The following is the code example referenced above:

```
1       public void Main( )
2       {
3           // static_id=1, dynamic_id=101, name=a
4           Object a = new Object( );
5
6           // static_id=2, dynamic_id=102, name=d
7           DynamicObject d =
                LoadDynamicObject("http://myservice?object=5");
8           d.InvokeDynamicMethod("DynamicFunction", a);
9       }
10
11      // dynamic_id=101, name=o
12      public void DynamicFunction(Object o)
13      {
14      }
```

Accordingly, the principles described herein permit for the automated construction of architecture diagrams that merge static models with dynamic behaviors acquired during a dynamic execution of the computer program, providing a rich presentation and intuitive understanding of the structure and operation of a computer program. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer storage media having thereon computer-executable instructions that, when executed by one or more processors of the computing system, cause a computing system to implement a computerized method of formulating an architectural diagram for a software program, where the computerized method is comprised of the following acts:
    performing a static analysis of the software program, the static analysis producing a static model of the software program which includes identifying a number of components of the software program and identifying relationships among one or more of the identified components;
    performing a dynamic analysis of the software program based on execution of the software program, the dynamic analysis producing an identification of one or more dynamic behaviors; and
    formulating an architecture diagram of the software program by merging the static model of the software program with the one or more dynamic behaviors identified from the dynamic analysis of the software program, said merging of the static model with the one or more dynamic behaviors being accomplished by performing one or both of the following:
        (i) mapping execution flow between the static model and the one or more identified dynamic behaviors; and
        (ii) mapping object instances between the static model and one or more of the identified dynamic behaviors.

2. The computer program product in accordance with claim 1, wherein the dynamic behavior is non-deterministic using the static analysis alone.

3. The computer program product in accordance with claim 1, wherein the dynamic behavior includes actual values of parameters exchanged between components during the execution of the software program.

4. The computer program product in accordance with claim 1, wherein the dynamic behavior includes an identification of an execution path traversed during the execution of the software program.

5. The computer program product in accordance with claim 1, wherein the dynamic behavior includes an identification of additional components invoked during the execution of the software program, but which were not identified in the static model of the software program.

6. The computer program product in accordance with claim 1, wherein the architectural diagram is a sequence diagram.

7. The computer program product in accordance with claim 1, wherein the architectural diagram is a dependency graph.

8. The computer program product in accordance with claim 1, wherein the static analysis is manually performed.

9. The computer program product in accordance with claim 1, wherein the architectural diagram is automatically generated as a display.

10. A computer-implemented method of formulating an architectural diagram for a software program, the computer-implemented method comprising the following acts:
    performing a static analysis of the software program, the static analysis producing a static model of the software program which includes identifying a number of components of the software program and identifying relationships among one or more of the identified components;

performing a dynamic analysis of the software program based on execution of the software program, the dynamic analysis producing an identification of one or more dynamic behaviors; and formulating an architecture diagram of the software program by merging the static model of the software program with the one or more dynamic behaviors identified from the dynamic analysis of the software program, said merging of the static model with the one or more dynamic behaviors being accomplished by performing one or both of the following:

(i) mapping execution flow between the static model and the one or more identified dynamic behaviors; and (ii) mapping object instances between the static model and one or more of the identified dynamic behaviors.

11. The computer-implemented method in accordance with claim 10, wherein the static analysis is at least partially manually performed.

12. The computer-implemented method in accordance with claim 10, wherein the static analysis is performed automatically by a computing system.

13. The computer-implemented method in accordance with claim 10, wherein the dynamic behavior is non-deterministic using the static analysis alone.

14. The computer-implemented method in accordance with claim 10, wherein the dynamic behavior includes actual values of parameters exchanged between components during the execution of the software program.

15. The computer-implemented method in accordance with claim 10, wherein the dynamic behavior includes an identification of an execution path traversed during the execution of the software program.

16. The computer-implemented method in accordance with claim 10, wherein the dynamic behavior includes an identification of additional components invoked during the execution of the software program, but which were not identified in the static model of the software program.

17. The computer-implemented method in accordance with claim 10, wherein the architectural diagram is a sequence diagram or a dependency graph.

18. The computer-implemented method in accordance with claim 10, wherein the architectural diagram is automatically generated as a display.

19. A computer program product comprising one or more physical computer storage media having thereon computer-executable instructions that, when executed by one or more processors of the computing system, cause a computing system to implement a computerized method of formulating an architectural diagram for a software program, where the computerized method is comprised of the following acts:

performing a static analysis of the software program, the static analysis producing a static model of the software program which includes identifying a number of components of the software program and identifying relationships among one or more of the identified components;

performing a dynamic analysis of the software program based on execution of the software program, the dynamic analysis producing an identification of one or more dynamic behaviors, wherein the dynamic behavior is non-deterministic using the static code analysis alone, wherein the dynamic behavior includes one or more of the following three items: 1) actual values of parameters exchanged between components during the execution of the software program, 2) an identification of an execution path traversed during the execution of the software program, 3) an identification of additional components invoked during the execution of the software program but which were not identified in the static model of the software program;

formulating an architecture diagram of the software program by merging the static model of the software program with the one or more dynamic behaviors identified from the dynamic analysis of the software program, said merging of the static model with the one or more dynamic behaviors being accomplished by performing one or both of the following:

(i) mapping execution flow between the static model and the one or more identified dynamic behaviors; and (ii) mapping object instances between the static model and one or more of the identified dynamic behaviors; and generating a display of the formulated architectural diagram.

* * * * *